United States Patent [19]

Guthrie

[11] 4,245,009
[45] Jan. 13, 1981

[54] POROUS COOLANT TUBE HOLDER FOR FUEL CELL STACK

[75] Inventor: Robin J. Guthrie, East Hartford, Conn.

[73] Assignee: United Technologies Corporation, Hartford, Conn.

[21] Appl. No.: 88,995

[22] Filed: Oct. 29, 1979

[51] Int. Cl.³ .................................... H01M 8/04
[52] U.S. Cl. .............................. 429/16; 426/26; 426/36
[58] Field of Search ............ 429/26, 34, 35, 72, 429/120, 37, 38, 39, 36

[56] References Cited

U.S. PATENT DOCUMENTS

| | | | |
|---|---|---|---|
| 3,321,334 | 5/1967 | Palmer | 429/26 |
| 3,515,593 | 6/1970 | Nickols, Jr. | 429/26 |
| 3,801,374 | 4/1974 | Dews | 429/26 |
| 3,964,930 | 6/1976 | Reiser | 429/26 |
| 3,990,913 | 11/1976 | Tuschner | 429/26 |
| 4,017,664 | 4/1977 | Breault | 429/44 X |
| 4,064,322 | 12/1977 | Bushnell et al. | 429/44 X |
| 4,115,627 | 9/1978 | Christner et al. | 429/44 |
| 4,129,685 | 12/1978 | Damiano | 429/38 |
| 4,157,327 | 6/1979 | Martin et al. | 429/26 X |
| 4,169,917 | 10/1979 | Baker et al. | 429/26 |

Primary Examiner—Anthony Skapars
Attorney, Agent, or Firm—Stephen E. Revis

[57] ABSTRACT

A coolant tube holder for a stack of fuel cells is a gas porous sheet of fibrous material adapted to be sandwiched between a cell electrode and a nonporous, gas impervious flat plate which separates adjacent cells. The porous holder has channels in one surface with coolant tubes disposed therein for carrying coolant through the stack. The gas impervious plate is preferably bonded to the opposite surface of the holder, and the channel depth is the full thickness of the holder.

6 Claims, 2 Drawing Figures

4,245,009

POROUS COOLANT TUBE HOLDER FOR FUEL CELL STACK

The Government has rights in this invention pursuant to Contract No. EY-76-C-03-1169 awarded by the Department of Energy.

CROSS REFERENCE TO RELATED APPLICATIONS

United States Patent Application Ser. No. 89,993 filed Oct. 29, 1979. titled "Densified Edge Seals for Fuel Cell Components" by Anthony J. DeCasperis, Richard J. Roethlein and Richard D. Breault and United States Patent Application Ser. No. 88,994 filed Oct. 29, 1977 titled "Fuel Cell Cooler Assembly and Edge Seal Means Therefor" by Richard D. Breault, Richard J. Roethlein and Joseph V. Congdon, filed on even date herewith and of common assignee with the present application, describes subject matter which is related to the present application.

BACKGROUND OF THE INVENTION

1. Field of the Invention

This invention relates to electrochemical cells.

2. Description of the Prior Art

One type of the electrochemical cell is a fuel cell. A typical fuel cell is comprised of a matrix material for holding electrolyte and an electrode disposed on each side of the matrix and in contact therewith. Reactant gases are fed to the non-electrolyte facing side of each electrode. In a stack of fuel cells gas impervious separator plates are disposed between adjacent cells. The cells convert the reactants, such as hydrogen and air, (i.e., oxygen) into DC electrical power in a manner well known in the art. The electrochemical reaction produces, as a byproduct, waste heat which must be removed in a controlled manner to maintain the cells at the desired operating temperature. For most efficient operation it is desirable to maintain all cells at a uniform temperature and at a maximum level consistent with material compatibility characteristics.

In the most common type of fuel cell stack the gas separator plate is relatively thick and includes grooves on each side thereof which carry the reactants across electrodes disposed on opposites sides of the separator. Representative of this type of cell construction are commonly owned U.S. Pat. Nos. 3,990,913; 3,964,930; and 4,157,327. Another type of cell construction is shown in commonly owned U.S. Pat. No. 4,115,627. In that patent the gas separator is a thin flat plate. The electrode is made thicker and the channels for carrying reactant gas are formed in the non-matrix facing side of the electrode. Yet another construction is shown in commonly owned U.S. Pat. No. 4,129,685. In that fuel cell structure there are no reactant gas channels. The electrodes, or more precisely the electrode substrate, is made quite thick and includes enough pores which are sufficiently large to permit a substantially free flow of the reactant gas therethrough both perpendicular to and parallel to the substrate. In one embodiment a smaller pore "reservoir layer" is disposed between this highly porous electrode layer and the gas separator and serves the function of storing excess electrolyte volume during cell operation.

Until now cell cooling has been accomplished by flowing a cooling fluid through channels or passageways in the gas separator plate. Examples of cooling by this technique are shown in aforementioned commonly owned U.S. Pat. Nos. 3,990,913; 3,964,930; 4,157,327. In these designs coolant carrying tubes pass through the separator plates parallel to the surfaces of the electrodes. Generally every third or fourth separator plate in a stack of cells will be required to carry this coolant flow. Note that in all of these designs the separator plate is also required to include grooves on each side thereof for carrying the reactant gases to the electrodes on either side thereof. It is apparent from the foregoing that separator plates which are required to carry coolant fluid must be made considerably thicker than separator plates which are not required to carry coolant fluid. Generally these plates are high density, nonporous graphite made by molding and graphitizing a mixture of resinous material and graphite powder. The thicker the plate the more difficult it is to make the plate defect free and to close tolerances due to the high temperature graphitizing steps.

In U.S. Pat. No. 3,990,913 the separator plate carrying the coolant tubes is made in two halves with semicircular grooves cut into each half, the halves mating together to form the circular channels within which the coolant tubes are alternately disposed. Once again, a disadvantage of this design is the difficulty in forming thick, gas impervious, graphite plates to close tolerances such that the plate halves mate properly. This is particularly true if it is desired to mold these pieces. A thermal caulk or grease must surround the coolant tubes to fill in any gaps therearound in order that adequate thermal conductivity between the cells and the coolant fluid is obtained. Note in FIG. 2 thereof the gas separator 18a with cooler tube passageways requires about twice the thickness of a gas separator such as 18 which does not include the cooler tube passageway.

In U.S. Pat. No. 3,964,930 the overall thickness of the separator plate carrying the cooler tubes has been reduced by forming the cooler tube channels in the surface of the plate adjacent one of the electrodes. The cooler tubes, in this configuration, are more exposed to the corrosive environment of the electrolyte; but this is compensated for by a coating of electrolyte resistant perfluoroalkoxy or polytetrafluoroethylene on the external surface of the tubes. One disadvantage of this construction is that the tube carrying passageways must necessarily take the place of reactant gas carrying channels; this reduces the uniformity of reactant gas flow to the electrodes and requires an increase in the thickness of the gas separator plate so that the remaining gas channels can be made larger so as to accommodate the additional reactant gas normally carried by the missing channels. While the overall size of this gas separator plate is less than the overall size of the gas separator plate shown in U.S. Pat. No. 3,990,913, it is still thicker than plates which do not carry coolant.

SUMMARY OF THE INVENTION

An object of the present invention is to eliminate the need for the fuel cell gas separator plate as the coolant carrier in a stack of electrochemical cells.

Another object of the present invention is a novel electrochemical cell stack component which is adapted to carry the cell coolant fluid through the stack.

Accordingly, a cooler assembly for use between consecutive cells in a stack of fuel cells comprises a fibrous, gas porous holder layer having coolant tubes passing in-plane therethrough within channels in one surface of the layer. The holder is adapted to be sandwiched between a flat, gas impervious separator plate and the ribbed side of a ribbed electrode substrate. Preferably the holder is bonded to the separator plate.

One advantage of this invention is that the gas impervious separator plates are no longer required to carry coolant tubes or coolant fluid; therefore, they can be made flat and thin and are easier to manufacture. Furthermore, since the coolant tube holder is not required to have channels for carrying reactant gas (the channels for reactant gas are in the electrode substrate), it can be more easily optimized for efficient cooling with minimum thickmess.

Preferably the holder is made from a gas porous, graphitized, resin bonded carbon fiber mat. The coolant tube channels can easily be machined into this material. If, as in an exemplary embodiment, the holder is bonded to the separator plate, the channels may be machined, after bonding, to a depth which is equivalent to the full thickness of the holder. This minimizes the required holder thickness.

The foregoing and other objects, features, and advantages of the present invention will become more apparent in the light of the following detailed description of preferred embodiments thereof.

DESCRIPTION OF THE PREFERRED EMBODIMENT

Figure 1:
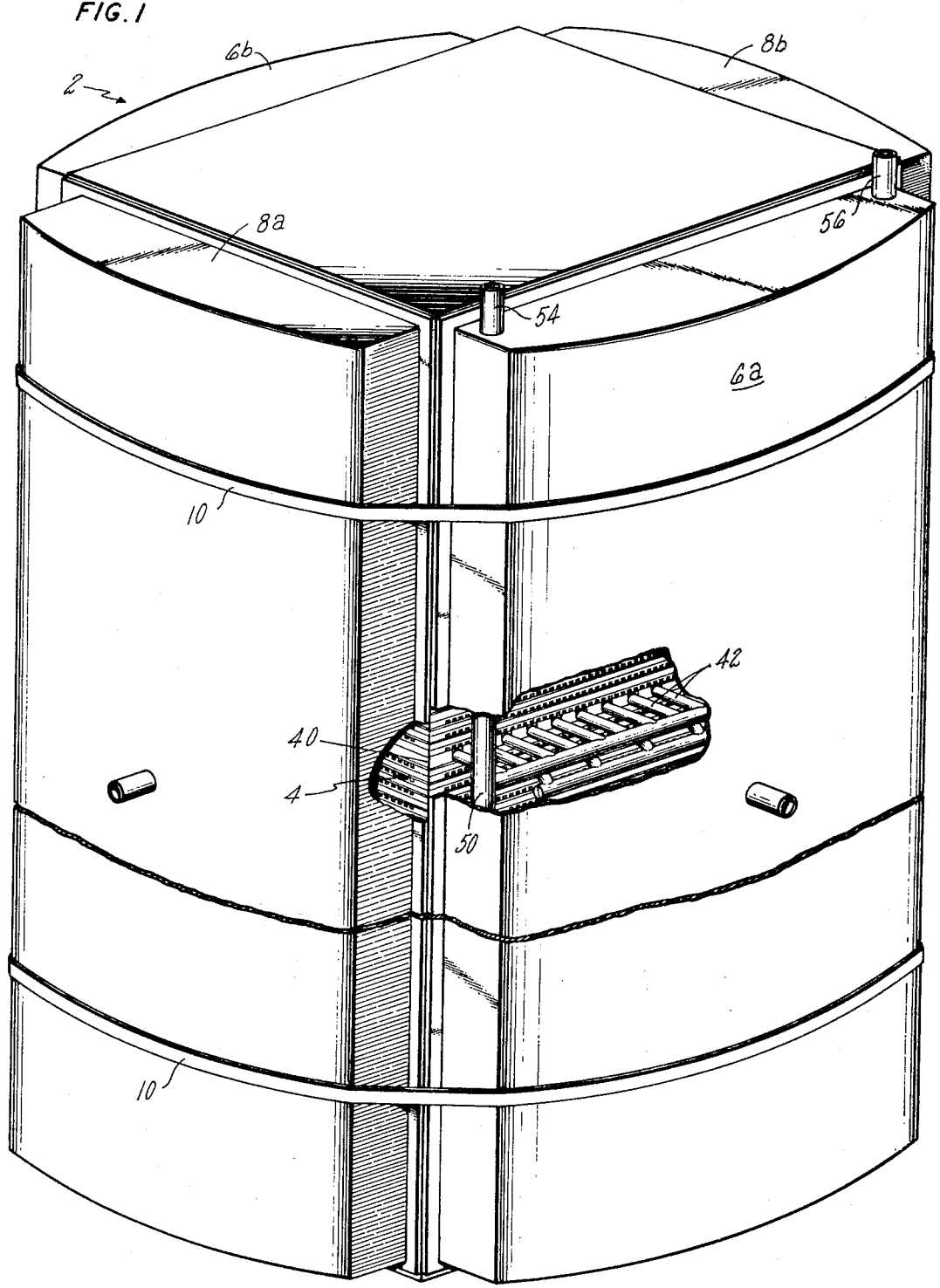
FIG. 1 is a perspective view, partly broken away, showing a fuel cell stack assembly incorporating the features of the present invention.

Referring to FIG. 1, a fuel cell stack assembly is generally referred to by the number 2. The assembly 2 includes a fuel cell stack 4 with reactant gas manifolds 6a, 6b, 8a, 8b covering each of the four surfaces of the stack. Manifolds 6a, 6b are the fuel (i.e., hydrogen) inlet and outlet manifolds, respectively; and manifolds 8a, 8b are the oxidant (i.e., air) inlet and outlet manifolds, respectively. The manifolds are held in sealing relationship to the faces of the stack 4 by a plurality of bands 10.

Figure 2:
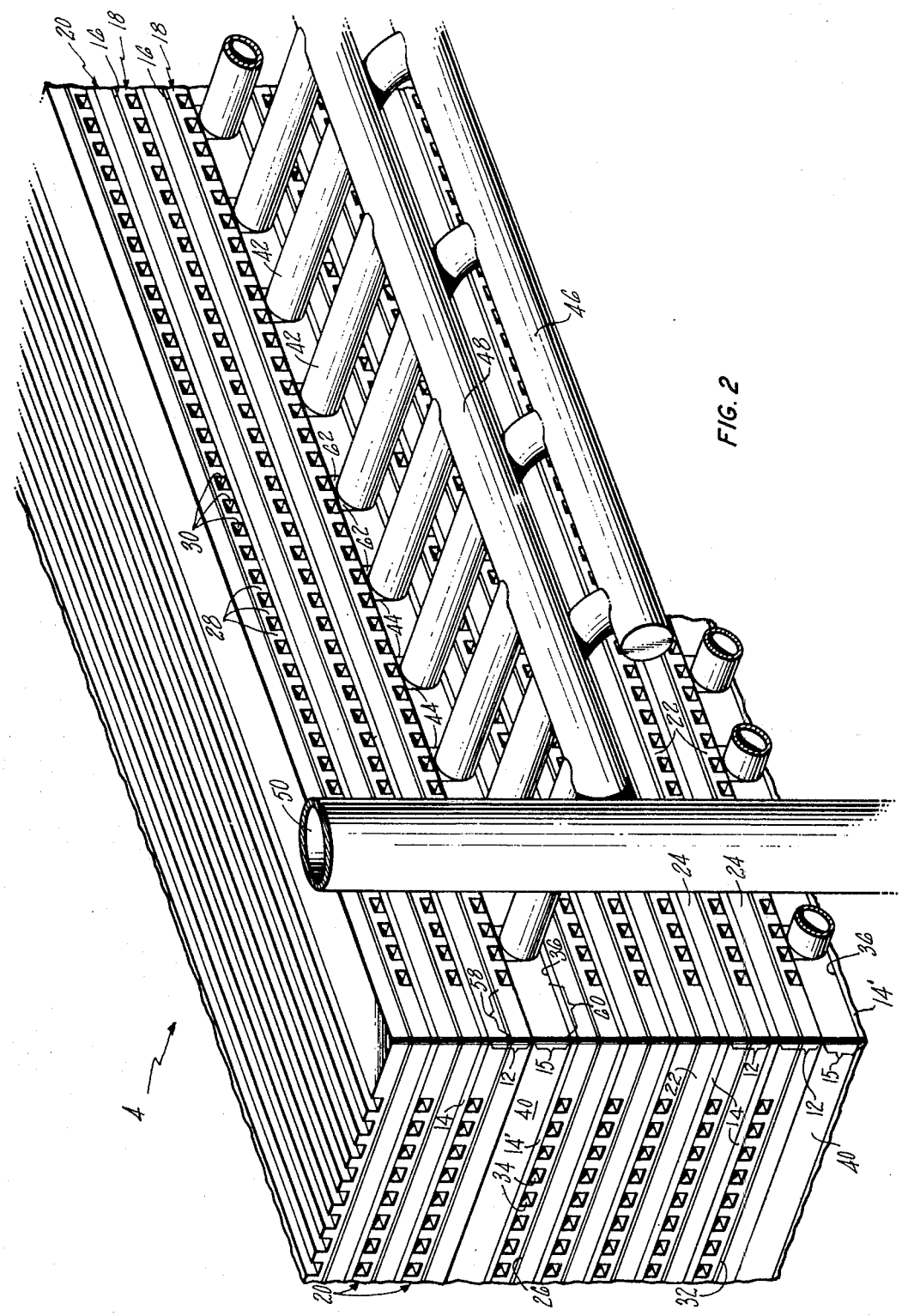
FIG. 2 is an enlarged view of a portion of the fuel cell stack of FIG. 1.

Details of the fuel cell stack 4 are best shown in FIG. 2. Each stack 4 is comprised of a plurality of fuel cells 12 separated by either a single, flat, gas impervious separator plate 14, or by a coolant holder assembly 15, which includes a separator plate 14' which is identical to the separator plates 14. The gas impervious plates 14, 14' may be made by any known method and of any material which is compatible with and can withstand the operating environment within the cell. If the fuel cell electrolyte is phosphoric acid these plates are usually made from graphite. For example they may be made by molding, under pressure, a dry mixture of graphite powder and thermosetting resin, the molded part subsequently being cured and then heat treated to a temperature of at least 2000° C. to graphitize the resin. Preferably the plate is no greater than 50 mils thick with 30 to 35 mils thick being most preferred. In this exemplary embodiment the plates 14, 14' are 33 mils thick, about 20 inches long, and about 20 inches wide.

The basic fuel cell construction is the same as that shown in and described in commonly owned U.S. Pat. No. 4,115,627 which is incorporated herein by reference. Each cell 12 includes a thin electrolyte retaining matrix layer 16 having an anode electrode 18 disposed on one side thereof and a cathode electrode 20 disposed on the other side thereof. Phosphoric acid is the electrolyte, and the matrix layer 16 between the anode and cathode electrodes is preferably a 5 mil thick layer of silicon carbide with a binder such as polytetrafluoroethylene, as described in commonly owned U.S. Pat. No. 4,017,664.

The anode and cathode electrodes each comprise an 80 mil thick fibrous gas porous substrate 22, 24, respectively. The anode substrate 22 includes a flat surface 26 which faces the matrix layer 16, and has a plurality of parallel ribs 28 on the opposite surface. On the flat surface 26 of the substrate is disposed a thin layer of catalyst (not shown). The catalyst layer preferably has a thickness on the order of 2 to 5 mils. The ribs 28 define parallel grooves 30 therebetween which extend across the cell interconnecting the manifolds 6a, 6b. The inlet manifold 6a feeds a gaseous fuel such as hydrogen into the grooves 30. Unreacted hydrogen and reaction products exit from the other ends of the grooves 30 into the outlet manifold 6b.

The cathode electrodes 20 are similar in construction to the anode electrodes 18. Thus, on the flat surface 32 of the cathode substrate 24 is a thin layer of catalyst; and on the opposite side of the cathode substrate 24 are ribs which define grooves 34 for carrying the oxidant across the cells from the air inlet manifold 8a to the outlet manifold 8b in a direction perpendicular to the fuel flow across the anode electrodes 18.

In accordance with the present invention, cooling is provided by passing a coolant fluid through the stack 4 in heat transfer relationship to the cells 12 which generate heat during operation. For this purpose a plurality of coolant holder assemblies, such as the assembly 15 shown in the drawing, are disposed between certain pairs of consecutive cells 12 in the stack 4. The number of coolant holder assemblies needed will depend on numerous factors relating to the desired maximum temperatures within the stack and the required uniformity of temperatures throughout the stack. In this embodiment the stack has about 270 cells and there is a coolant holder assembly after every fifth cell.

Each coolant holder assembly 15 comprises a gas impervious separator plate 14' resin bonded at its surface 36, to a gas porous, fibrous cooler holder layer 40. The coolant is carried in tubes 42 disposed in channels 44 machined into the cooler holder layer 40. The channels 44 are parallel to the grooves 30 in the anode electrode 18.

In this embodiment various pairs of tubes 42 are actually opposite ends of the same tube. A tube passes through the cell in one channel 44, makes a U-turn in the space formed by the outlet manifold 6b, and returns through a different channel 44 in the cell to the inlet manifold 6a. The "returning" tube ends are interconnected by a horizontal coolant outlet header 46, while the other or "feeding" tube ends are interconnected by a horizontal coolant inlet header 48. All the inlet headers 48 are interconnected by a vertical feed tube 50; and the outlet headers 46 are interconnected by a vertical return tube (not shown). Fresh coolant enters the vertical feed tube 50 at a main inlet 54 and is distributed to the inlet headers 48. The coolant then passes through the coolant tubes 42 and picks up heat from the cells 12. The heated coolant passes from the tubes 42, to the outlet headers 46, to the vertical return tube, and leaves the stack 4 via a main outlet 56.

Since the holder layers 40 and the electrode substrates 22, 24 are gas porous, means must be provided to prevent, for example, fuel traveling through the anode substrate from passing into the oxidant manifolds 8a, 8b through the edge portions 58, 60 of the anode substrate and holder layer, respectively. This may be accomplished using "wet seals" along these edges of the type described in commonly owned U.S. Pat. No. 3,867,206 which is incorporated herein by reference. Thus, the edges of the holder layer parallel to the channels 44, and the edges of the substrates parallel to their respective grooves 30, 34 may be treated such that their pore size is reduced and they display a highly hydrophilic nature. They would then be saturated with electrolyte. The electrolyte, held by capillary action in the edge, prevents the passage of gas therethrough. The wetting action of the electrolyte also inhibits gas leakage between contiguous surfaces of adjacent components. One edge treatment suitable for the present application is described in commonly owned U.S. Pat. No. 4,035,551, wherein the edge portions of electrode substrates are impregnated with the same material from which the matrix layer is made. Thus the edges 58, 60 may be impregnated with silicon carbide using a liquid vehicle which would subsequently be removed by heating. Another method for creating edge seals is described in commonly owned U.S. patent application Ser. No. 89,993 titled Densified Edge Seals for Fuel Cell Components filed on even date herewith. As described therein the edge portions are densified (i.e., their pore size is reduced) with the same material as the main body portion of the holder layer by building up the thickness of the edge portions during fabrication of the holder layer and then compressing the thickened edges to the desired thickness of the holder layer.

The cooler holder layer 40, in this embodiment, is a graphitized gas porous mat of resin bonded, chopped carbon fibers, as are the electrode substrates 22, 24. We prefer a blend of 30% phenolic resin and 70% carbon fibers, by weight. We have found that the holder layer 40 should have a density throughout at least as high as the density of the electrode substrates (i.e., at least about 0.5 gm/cc$^3$) for adequate strength, thermal and electrical conductivity. A density of at least 0.6 gm/cc is preferred. Our present holders have a density of about 0.7 gm/cc and are about 63% porous while the electrode substrates 22, 24 used in conjunction therewith have a density of about 0.53 gm/cc, which is equivalent to a porosity of about 75%. Of course, the edge seals will have an even greater density. While very low density is preferred for the electrode substrates because they must readily transmit reactant gas therethrough to the catalyst layers, this is not a requirement of the cooler holder layers wherein an optimum combination of strength, thermal and electrical conductivity, as well as ease of fabrication, are sought.

To fabricate the holder layer a dry blend of the phenolic resin and carbon fibers is placed in a hopper having a screen covered bottom opening. As a conveyor belt moves under the opening the hopper is vibrated and the material passes through the screen onto the conveyor belt at a uniform, preselected rate which is determined by the belt speed, screen mesh size, material characteristics, hopper vibration mode, and other factors. The deposited powder is then simultaneously densified and cured by hot pressing between platens (or rollers) to the desired thickness of the holder at 100 psi and a temperature between 150° and 175° C. The compacted, cured material is then further heated in an oven, in steps, up to about 2100° C. to first carbonize and ultimately fully graphitize the part. Although optional, it is preferable to wetproof the holder (except in the area of the "wet seal" edges) by impregnating it with about 100–120 mg/cc of fluorinated ethylene propylene from DuPont's FEP-120 fluorinated ethylene propylene dispersion. The liquids would then be removed from the holder by heating. Wetproofing will help protect the cooler tubes against corrosion by the fuel cell electrolyte.

To form the coolant holder assembly 15, the holder 40 is first bonded to the surface 36 of the plate 14' using DuPont's TFE-30 polytetrafluoroethylene resin as the adhesive, a temperature of about 350° C., and a pressure of about 30 psi applied for 5 to 15 minutes. (A fluoroethylene propylene resin would also be suitable, such as DuPont's FEP-120 resin). The tube channels 44 are then machined into the holder to a depth substantially the same as the holder thickness, which is also about the same as the outer diameter of the coolant tubes 42. The width of the channels 44 is preferably slightly less than the tube diameter (i.e., 0.005 inch less based on a 0.140 diameter tube). The cooler tubes are then pressed into the channels. The interference fit improves thermal conductivity. At this point a thermally conductive hydrophobic caulk may be applied over the tubes to fill in the gaps 62 between the tubes and channel walls. One suitable caulk is described in hereinbefore referred to commonly owned U.S. Pat. No. 4,157,327 and is a combination of polytetrafluoroethylene and fluorinated ethylene propylene filled with graphite powder for conductivity. The cooler tubes 34 are preferably made from copper for good thermal conductivity and low yield strength which allows easy assembly of the tube array into the fragile holder plate. However, since copper is not resistant to the phosphoric acid electrolyte, the tubes are coated with an acid resistant 2 to 5 mils thick layer of perfluoroalkoxy prior to putting them into the holder.

The adhesive resin layers between the plates 14' and the sealing edges 58, 60 are continuous to prevent gas leakage between the surfaces thereof. On the other hand, since there must be good electrical conductivity from cell to cell through the stack 4 including the cooler assemblies 15, the adhesive layers between the plate 14' and the holder layer 40 cannot be continuous because the adhesive is not electrically conductive, We, therefore, apply the adhesive between these surfaces as a uniformly distributed pattern covering only about 25% of the actual surface area to be bonded. The unbonded areas are, of course, electrically conductive. Other methods for imparting electrical conductivity would also be acceptable. Alternatively, the holder layer 40 need not be bonded to the separator plate 14'; but, in that case, the holder layer would have to be made somewhat thicker (say about 25 to 30 mils thicker) because the channels 44 could not be machined to the full thickness of the part. In that case either surface of the holder layer could be bonded to the plate 14'.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An electrochemical cell stack comprising first and second fuel cells separated by a cooler assembly, each cell comprising a pair of electrodes spaced apart with a matrix layer disposed therebetween for retaining electrolyte, each electrode including a gas porous substrate having a flat first surface facing said matrix layer and a second surface facing away from said matrix layer, said second surface including ribs which define grooves therebetween extending across said substrate for carrying reactant gas during cell operation, said cooler assembly comprising a gas porous, graphitized, resin bonded, carbon fiber tube holder having first and second oppositely facing surfaces and a gas impervious graphite plate having first and second oppositely facing surfaces, said first surface of said plate being contiguous with said second surface of one of said electrode substrates of said first cell, said second surface of said plate being contiguous with and resin bonded to said first surface of said holder, said second surface of said holder including, a plurality of parallel channels therein extending across the length of said holder, said cooler assembly including tubes disposed in said channels and passing through said holder for carrying a coolant into heat exchange relationship with said cells, said channels having a depth and width which is substantially the same as the outer diameter of said tubes, said second surface of said holder being contiguous with said second surface of an electrode of said second fuel cell, said channels in said holder being parallel to said grooves in said substrate contiguous therewith, said cooler assembly including gas seal means along each edge of said holder parallel to said channels to prevent gas leakage from said holder through said edges.

2. The stack according to claim 1 wherein the space within said channels around said tubes is filled with a thermally conductive caulk.

3. The stack according to claim 1 or 2 wherein said holder and said substrates are comprised of carbon fibers and a resin binder which have been converted to graphite.

4. The stack according to claim 3 wherein said holder and plate are bonded together with a fluorocarbon polymer resin.

5. An electrochemical cell stack component comprising:
   a gas impervious graphite separator plate having substantially flat oppositely facing surfaces; and
   a gas porous cooler holder of resin bonded, carbon fibers which have been graphitized, one side of said holder being bonded to one of said surfaces of said plate and in electrical contact therewith, the other side of said holder including channels extending thereacross for carrying coolant tubes, said channels having a depth which is substantially the thickness of said holder.

6. The electrochemical cell stack component according to claim 3 or 5 wherein said holder has a density throughout of at least 0.6 gm/cc.

* * * * *

UNITED STATES PATENT AND TRADEMARK OFFICE
CERTIFICATE OF CORRECTION

PATENT NO. : 4,245,009
DATED : January 13, 1981
INVENTOR(S) : ROBIN J. GUTHRIE

It is certified that error appears in the above—identified patent and that said Letters Patent is hereby corrected as shown below:

Column 1, line 11: "Ser. No. 89,993" should be "Ser. No. 88,993".

Column 5, lines 25-26: "Ser. No. 89,993" should be "Ser. No. 88,993".

Signed and Sealed this

Twenty-sixth Day of May 1981

[SEAL]

*Attest:*

RENE D. TEGTMEYER

*Attesting Officer*  *Acting Commissioner of Patents and Trademarks*